Oct. 6, 1970 H. B. BELL ET AL 3,531,856
ASSEMBLING SEMICONDUCTOR DEVICES
Original Filed Nov. 27. 1964 4 Sheets-Sheet 1
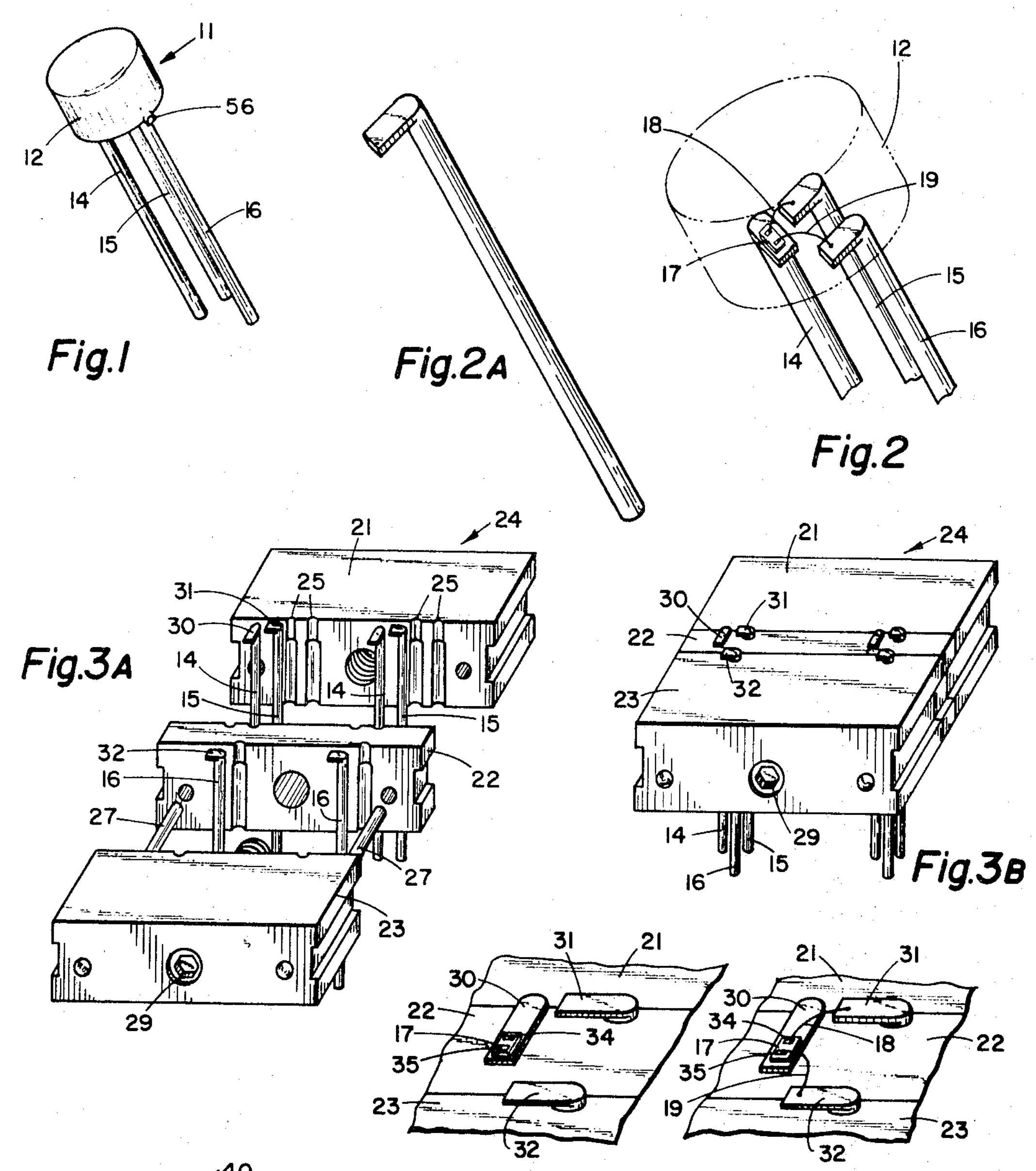
Fig.1 Fig.2A Fig.2 Fig.3A Fig.3B
Fig.3C Fig.3D
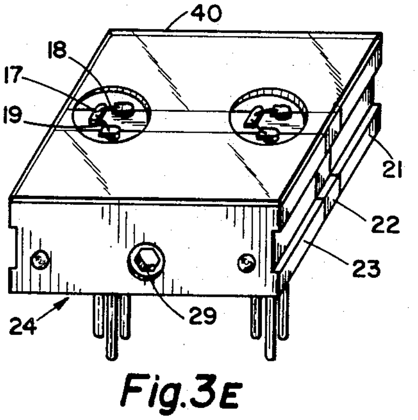
Fig.3E
INVENTORS
Harold B. Bell
George A. Doyle
BY Mueller, Aichele + Rauner
ATT'YS.

ASSEMBLING SEMICONDUCTOR DEVICES

Original Filed Nov. 27, 1964 4 Sheets-Sheet 2

INVENTORS,
Harold B. Bell
George A. Doyle

BY Mueller, Aichele & Rauner
ATT'YS.

Oct. 6, 1970 H. B. BELL ET AL 3,531,856

ASSEMBLING SEMICONDUCTOR DEVICES

Original Filed Nov. 27. 1964 4 Sheets-Sheet 3

INVENTORS
Harold B. Bell
George A. Doyle

BY Mueller, Aichele + Rauner
ATTYS.

ASSEMBLING SEMICONDUCTOR DEVICES

INVENTORS
Harold B. Bell
George A. Doyle
BY
Mueller, Aichele & Rauner
ATT'YS.

3,531,856

ASSEMBLING SEMICONDUCTOR DEVICES

Harold B. Bell, Phoenix, Ariz., and George A. Doyle, San Jose, Calif., assignors to Motorola, Inc., Franklin Park, Ill., a corporation of Illinois

Original application Nov. 27, 1964, Ser. No. 414,202, now Patent No. 3,444,440, dated May 13, 1969. Divided and this application May 22, 1967, Ser. No. 639,943
The portion of the term of the patent subsequent to Feb. 6, 1985, has been disclaimed
Int. Cl. B01j *17/00*
U.S. Cl. 29—583 1 Claim

ABSTRACT OF THE DISCLOSURE

A semiconductor device is assembled and encased in plastic by a one-step transfer molding operation. In one embodiment of the process electrical leads for the device are stamped out in the form of a flat metal clip composed of a supporting frame member and a number of leads extending therefrom. The semiconductor element is mounted on one of the leads and fine wire connections are made between the semiconductor element and the remaining lead or leads. The assembled device is then placed in a transfer mold where the semiconductor element and the wire-connected lead ends are encased in plastic. Upon removal from the mold the supporting frame member is trimmed from the lead clip, thereby providing a completed unit.

This application is a division of our copending application entitled "Semiconductor Device," Ser. No. 414,202 filed Nov. 27, 1964, now Pat. No. 3,444,440, dated May 13, 1969.

BACKGROUND OF THE INVENTION

The present invention relates generally to solid state semiconductor devices, such as transistors and more complex integrated circuits. It relates more specifically to an improved method for encasing such a device which has fine wires attached to the semiconductor element or elements therein, and an improved solid state semiconductor unit, or "package" as such units are presently referred to in the art particularly adapted to encasing by such method.

The terms "package" and "unit" will be used herein to refer to assemblies with which the present invention is concerned, and which include a transistor, or integrated circuit, or other semiconductor device encased in a protective housing, and with appropriate leads protruding from the housing.

The recent advent of integrated circuits, and the order of magnitude by which the weight and size of electronic components can be reduced by the use of integrated circuits, has produced a pressing need for something more suitable and appropriate as a package which incorporates the integrated circuit.

There are several types of transistor and integrated circuit "packages" presently in use. A first type of package is usually cylindrical in shape and more or less follows the traditional transistor outline. A modified flat package, also in present use, is more appropriate for housing the complex type of integrated circuit element.

The flat package is the result of continued research into the problem of providing a suitable package for the recently developed complex monolithic integrated circuit element. This latter package configuration has been found to be rugged and durable, and particularly adapted to its intended purpose.

As this art progressed the size of the semiconductor element or elements has become smaller, and more complex in structure. The wires directly connected to such elements are extremely fine—in the order of .0007 to .0020 inch, for instance, which is actually finer than the average human hair.

Economic and competitive conditions in the semiconductor art represented in the above devices dictate that yields, that is, the percentage of acceptable devices manufactured, be high, that the reproducibility of a device for uniformity between large quantities of devices manufactured, likewise be high, and that mass production be accomplished at a relatively low cost.

Altogether, this has posed serious problems in encasing the assembly of elements including the fine wires, and providing the most effective method of assembly and structure.

The present invention is concerned with the foregoing types of transistor and integrated circuit packages; and it is a general object of the invention to provide a improved method for manufacturing devices of the types identified, which provides a high yield, and ultimate reliability of a high order, all at a competitive cost.

The integrated circuit element usually comprises a miniature chip of semiconductor material, such as silicon, in the present state of the art, and the integrated circuit device provides an extreme size and weight reduction relative to a combination of components to give a comparable circuit result, as with transistors, diodes, and the like. The silicon chip, for example, with its integrated components, weighs just a few milligrams, and occupies a volume of a few ten-thousands of a cubic inch.

The miniature integrated circuit assembly must also be connected conveniently into an operable system of equipment. Although these comprise a tiny structural assembly, the assembly must have leads large and strong enough to be conveniently handled and connected into the external system or equipment.

The usual practice in the cylindrical construction previously noted is to mount the integrated circuit element on a header which forms the bottom of a cylindrical box. A plurality of relatively sturdy leads are brought through the header, through appropriate glass-to-metal seals, and fine wires are connected from these leads to the electrodes of the integrated circuit element. As a final step, a cover is sealed onto the box. Such a construction is expensive, both in cost of parts and actual cost of assembly.

The usual aforementioned prior art thin, flat, rectangular "package" is constructed in the forme of a two-piece box. The integrated circuit element is cemented to the bottom of the box, and relatively sturdy leads are brought out through one or more sides of the box, and secured thereto in appropriate seals. These leads are then wire bonded to the electrodes on the integrated circuit element, by fine wires. As a final step, the top of the box is cemented, or bonded, or otherwise sealed in place.

As we have stated, the can or box type of enclosures or casings for these semiconductor devices are in themselves expensive, relatively. In efforts to simplify such enclosure both structurally and by assembly, the art has turned to encasement by plastics which are applied by potting methods which are time consuming and costly in the large amount of molds used for the potting, for the time for pouring the plastic onto the assembly, and then the curing time is great, requiring many molds and much space for handling. However, attempts at pressure molding have not been successful because the fine wires were broken or torn from their contact position as the plastic was applied in a mold.

The present invention, unlike the prior art, provides a unique and improved method of encasing semiconductor "packages," whereby the number of steps required for their fabrication is materially reduced, and these steps are accomplished with an improvement in yields and with a high rate of production per unit of time. This results in lower cost of assembly and an improved high quality unit.

With reference to the structural improvements embodied in our invention, the usual prior art practice as mentioned in the construction of both the flat and the cylindrical type of circuit package is to use a "header" on which the integrated circuit, or other semiconductor element, is initially placed. This subsequently forms the bottom of the box, or housing, in which the element and its components are contained, and through which the connecting leads to the components protrude. Such a header represents a major cost of the package, including the integrated circuit. In addition, the use of such a header affects the cost of assembly, as well as the complexity of assembly.

THE INVENTION

In carrying out the concepts of the present invention, the various active elements are assembled in a simplified and straightforward manner wherein the mechanical parts serve as headers for the semiconductor elements, and the enclosing housing is formed as a molded plastic package by means of a one-step transfer molding operation.

Accordingly, an important object of the present invention is not only to provide an improved transistor or integrated circuit package, but also to assemble the device, and particularly to encase the same in a manner such that its total cost is materially reduced relative to prior devices without impairing in any manner its electrical capabilities or mechanical characteristics.

A feature of the invention is to assemble and then enclose or encase the assembly in a moisture resistant, rugged package, which is light in weight and compact, without injuring the internal pieces of the package while performing the encasing in a rapid positive manner.

A feature of the invention is to encase by pressure molding, the assembled pieces including fine wires bonded or otherwise secured to the contact portions of the semiconductor elements without breaking those wires.

It is also a feature of our invention to use thermosetting plastic material for the encasing and provide such a plastic to the mold cavity when its liquidity is at a maximum and polymerization and cross-linking is at a minimum. The word "cure" is used in this art as the single term for polymerization and cross-linking and will be used in that sense through this specification.

A further feature of the invention is to use one of the electrical leads of the assembly or device as an appropriate pad upon which the active semiconductor element is placed, connect the electrodes of the semiconductor element to corresponding leads, and then provide a molded plastic casing by means of a one-step molding operation.

As will be described, therefore, all embodiments of the invention disclosed herein are constructed in a manner such that the manufacturing costs are minimized by high speed molded encasing and the elimination of the prior art header and box construction; the semiconductor element is supported by one of the leads of the unit, which may also serve as a connection between the semiconductor element and an external circuit.

THE DRAWINGS

Other objects and advantages of the invention will become apparent from a consideration of the accompanying drawings, in which:

FIG. 1 is an enlarged view of a transistor package constructed in accordance with the concepts of the invention;

FIG. 2 is a view similar to FIG. 1, but in a transparent or shadow type of showing. The structure within the molded casing is visible and is double in size relative to FIG. 1;

FIG. 2A is a single combination device lead and mounting pad for a semiconductor element corresponding to one of the three for the device of FIG. 2;

FIGS. 3A–3H are a series of views illustrating the condition of the mold and the semiconductor assembly during the manufacture of the transistor package of FIGS. 1 and 2;

Figure 3F:
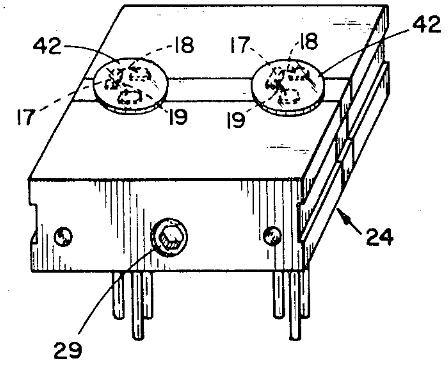

In the assembly of the unit shown in FIGS. 1 and 2, a transfer mold is used, as will be described, and part of the mold is also used as a jig for parts of the unit.

Formed, relatively rigid, electrical leads 14, 15, and 16 are gripped and held in proper location for the package assembly on the aforementioned mold. Each lead has a bent-over, flattened-end portion as shown in FIG. 2A. While the shaped leads are held firmly by the jig, the semiconductor element 17 is mounted on one of the flattened-end portions, and it is electrically connected to the other flattened-end portions by fine wires, as will be more specifically described. The assembly is then given a vapor-deposited oxide passivating treatment.

The jig portion is then fitted into the remaining portion of a transfer mold, and the semiconductor element and adjacent bent-over flattened-end portions of the shaped leads are completely encased in a suitable monolithic plastic housing by means of a one-step transfer molding operation. The mold is then removed, and the completed package is ready for testing.

The completed package 11 is illustrated in FIG. 1. Visible is the monolithic molding housing 12, and the relatively rigid leads 14, 15, and 16. These leads may be formed, for example, of gold-plated copper. The view of FIG. 1, for purposes of clarity, is shown several times larger than actual size of one embodiment of the invention.

The view of FIG. 2 is similar to that of FIG. 1, except that the molded casing 12 is shown in shadow form, so as to reveal the internal components of the assembly in final position in the completed device. In order to avoid any need for a separate header, the end of the lead 14 is bent over and flattened, as shown. The semiconductor chip element 17, in whatever composition is desired for a particular device, is mounted directly on the flattened, turned-over end portion of the lead 14. The upper end portions of the leads 15 and 16 are also bent over and flattened, and are positioned toward the semiconductor chip element 17, so that the span between the element 17 and the end portions of the leads 15 and 16 is made as small as possible.

Very fine and tiny wires 18 and 19, composed of aluminum or other suitable material, are used to connect the bent-over end portions of the leads 15 and 16 to the respective electrodes on the semiconductor chip element 17. For example, when the chip element 17 is in a transistor, rather than in a more complex integrated circuit, the wires 18 and 19 may be connected to the emitter and base electrodes of the element 17; whereas, the supporting lead 14 may be connected to the collector electrode by the bonding and mounting of the element thereon.

A typical example of the relative dimensions of the wires 18 and 19, compared to pins or leads such as 15 and 16, is that in the latter the diameter is approximately .020 inch, while the wire diameter is approximately .001 inch.

FIGS. 3A–3H illustrate the various conditions of the transfer mold during a typical fabrication method of the transistor of FIGS. 1 and 2.

As a preliminary step, the formed wire leads 14, 15, and 16 are placed in position between three clamping parts 21, 22, 23 of a jig 24. This jig may, for example, be composed of stainless steel, or other suitable material. The ends of the leads 14, 15, and 16, prior to being placed in the jig, are cold headed, or otherwise shaped, into the bent-over and flattened form shown and previously described.

The jig 24 is shown in FIG. 3A with its three clamping parts 21, 22, and 23 being widely separated in an exaggerated manner, in order to illustrate matching grooves 25 which extend across the clamping parts. These grooves serve to hold and locate the leads 14, 15, and 16 for subsequent operations. In practice, however, the three clamping parts 21, 22, and 23 of the jig are separated by just a few thousandths of an inch to permit the leads 14, 15, and 16 to be inserted between the matching grooves 25. Guide pins 27 maintain the three clamping parts 21, 22, and 23 of the jig 24 in alignment. Clamping of the leads 14, 15, and 16 between the clamping parts of the jig is accomplished by tightening a cap screw 29 to draw the clamping parts together (FIG. 3B).

It will be observed that the particular jig illustrated herein is constructed so that a pair of integrated circuit or transistor packages may be formed at the same time. However, the jig and accompanying mold can be enlarged to accommodate a greater number that this. The type of integrated circuit or transistor package shown in FIGS. 1 and 2 is illustrated and described in this example of use of the jig and mold.

As shown in FIG. 3B, the leads 14, 15, and 16 are clamped securely between the clamping parts 21, 22, and 23 of the jig 24. The flattened end portions on the leads 14, 15, and 16 are designated, respectively, as 30, 31, and 32. The leads are supported in the jig 24 so that the flattened-end portions are displaced a predetermined distance above the top surface of the jig. The leads 15 and 16 are positioned in the jig, relative to the lead 14, so that the flattened-end portions 31 and 32 are positioned in the same plane, and slightly above the plane of the flattened-end portion 30. The dimension for this is approximately .005 inch which is the thickness of the chip so as to have the wire bonding on the same plane. The pieces are so small that positioning and bonding must be done by microscopic observation. Hence, it is important to have the bonding all done on the same plane so the microscope does not have to be readjusted. The leads 15 and 16 are oriented so that the flattened-end portions 31 and 32 extend toward the flattened-end portion 30.

As previously mentioned, in order to preclude the necessity for a separate header, and so as to permit the casing of the package to be formed by a single step transfer molding operation, the flattened-end portion 30 on the lead 14 serves as a mounting base for the active semiconductor chip element (FIG. 3C).

In FIG. 3C a fragmentary view of the jig assembly is shown, including semiconductor element 17 mounted on the flattened portion 30 of lead 14 (FIG. 3B). In this particular embodiment, as mentioned before, semiconductor element 17 is a transistor provided with electrodes 34 and 35 on the base and emitter regions, for example, and a further electrode on the opposite side of the semiconductor element, representing the collector electrode.

The semiconductor element 17 is placed with its collector electrode resting on the desired location on the flat portion 30 of the lead 14. The collector electrode may be a thin layer of gold on the surface of the element. The semiconductor element is pressed against the flattened-end portion 30 and heated to about 30° C., for example. The heat and pressure are subsequently removed, and the semiconductor element 17 is thereby bonded to the flattened portion 30 of the lead 17.

The wires 18 and 19 (FIG. 3D) may be in the form of fine aluminum wires, as mentioned. These wires are bonded or otherwise attached to the electrodes 34 and 35 (each of which may be in the form of an aluminum layer deposited on the semiconductor element 17). The wires 18 and 19 are also connected, respectively, to the flattened-end portions 31 and 32 of the leads 15 and 16 (FIG. 3B).

Since the flattened-end portions of the leads extend into close proximity with the semiconductor element 17, the span of the fine wires 18 and 19 may be kept short to minimize breakage, as well as to reduce parasitic inductance.

A thin mask 40 (FIG. 3E) of any suitable composition is then placed over the jig. This mask covers the jig surface, but it exposes the element 17 and its associated components. A suitable protective film, such as metallic oxide, e.g., alumina or silica, is deposited through the mask 40 to cover the semiconductor element 17, as well as the fine wires 18 and 19 and the flattened-end portions of the leads 14, 15, and 16, all of these elements being exposed by the mask 40.

The application of the film of alumina or silica, for example, both protects and passivates the semiconductor element 17 and is in accordance with processes well known in the art.

The mask 40 is then removed, and the assembly takes on the appearance shown in FIG. 3F, with all formerly exposed pieces covered by a small, thin, disc-shaped deposit 42 of alumina or silica, for example, which was formed in the manner described.

Figure 3G:
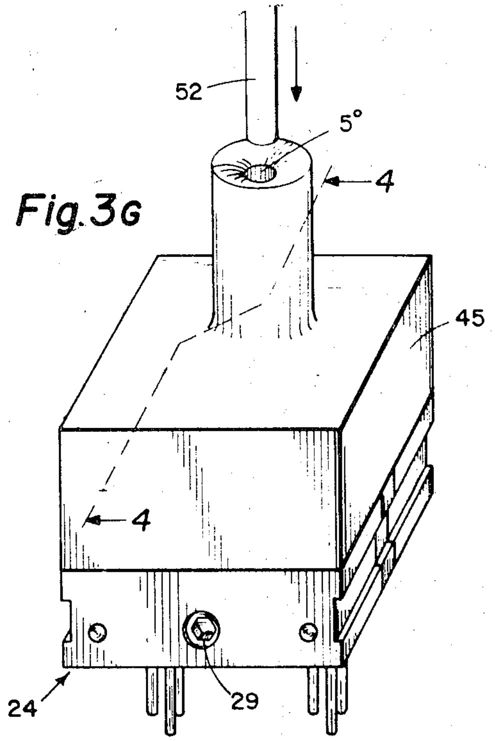

The jig 24 is then combined with a transfer mold. As shown in FIG. 3G, for example, the jig 24 forms the bottom portion of the transfer mold, and the upper part of the mold is designated 45 and is mounted on the upper surface of the jig part 24.

Figure 4:
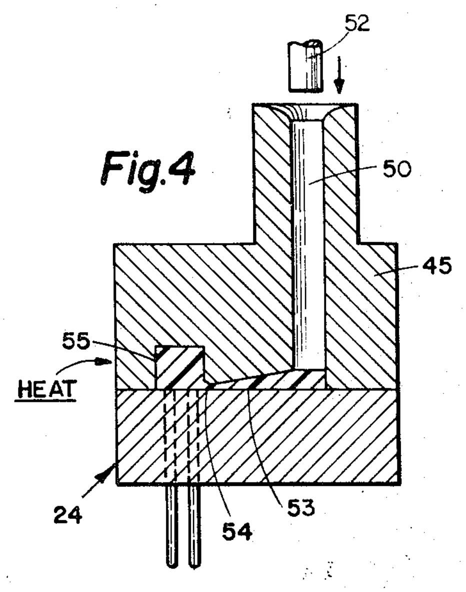
FIG. 4 is a sectional view, substantially on the line 4—4 of FIG. 3G, and showing a cross section of the mold used in the construction of the transistor of FIG. 1.

The upper part 45 of the mold has an external and internal configuration as shown in FIG. 4. This part includes a cylindrical passageway 50 through which an appropriate plastic material is introduced in powdered or pellet form. The parts of the mold are heated so that the powdered or pellet plastic material becomes molten. A piston or plunger 52 is pressed into the cylindrical passage 50, and the piston forces the plastic through a passageway or runner 53, then through an orifice or gate 54 into an internal mold cavity 55. The upper and lower parts 45 and 24 of the mold are held together in an appropriate manner, so as to permit the aforesaid operations to take place.

The deposit 42 (FIG. 3F) and the active elements of the device are positioned in the cavity 55. The operation of the piston 52 causes a monolithic housing or casing to be molded in and around and over the components in a single step, so as to produce the package shown in FIGS. 1 and 2.

Figure 3H:
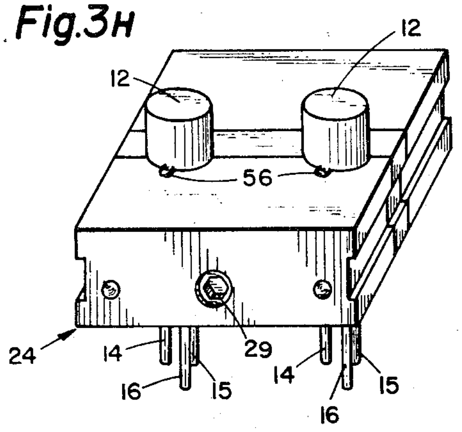

The upper part of the mold 45 is removed, and the assembly has the form shown in FIG. 3H. Then, the jig 24 may be opened by unscrewing the screw 29 so as to permit the removal of the completed element.

It will be noted that the cavity 54 (FIG. 4) is provided with an appropriate shape so that a key 56 (FIG. 1) may be formed of plastic on the outer surface of the package for subsequent locating and orientation purposes.

Although electronic devices or components have long been encased in plastics, the use of fine wires .001 inch in cross section or diameter introduced new problems upon which much time and effort has been spent without a satisfactory solution until the present invention. Semiconductor devices employing such wires had such a high incidence of breaking or tearing when subjected to pressure plastic encasing that the art employs a potting technique wherein the device, as a transistor or integrated circuit, is placed in a mold. The plastic materials are mixed at the time of use and are poured by hand or slowly by machine into the mold to flow into and around the assembly until the mold is filled. Then it is set aside to cure and harden. With the plastic used commercially for potting, several hours are required for curing and bringing the plastic and device to final condition for removal of the device.

The present invention has overcome the problems of "potting" as described above, and accomplishes pressure molding in a transfer-molding operation which in minutes provides a better product than potting, and ties up a mold and space for a very minute fraction of the time per device that potting requires. The resulting cost of manufacture is equally small compared with prior methods and structure.

This great improvement has been obtained with thermosetting plastic material with particular characteristics. Thermosetting plastics with relatively low molecular weight prepolymers, when initially placed in the complete mold as at 50 in FIG. 4, are melted during the passage through 50 and runner 53 so that when the liquid plastic is introduced into the cavity 55 through the gate 54 it must be at maximum liquidity and minimum polymerization and cross-linking, or curing. As a result of the low viscosity or highly liquid condition, the plastic flows over the assembly of FIG. 3F but exerts very little force on the fine wires, as 18 and 19 (FIG. 3D). Complete curing then takes place in the thermosetting plastic in a matter of less than five minutes, and the device can be removed from the mold.

We employ a thermosetting plastic and so design the dimensions of our mold (FIG. 4) that the time from the introduction of powder or pellets at the mouth of the passage 50 through the stage of liquification to the introduction in the cavity is 5 to 15 seconds. The configuration, location, and dimensions of the gate 54 are critical in controlling the flow of the plastic into the cavity. At this point, the critical condition previously mentioned of maximum liquidity or low viscosity and minimum cure must prevail in order to have the greatest freedom of flow of the plastic under pressure without breaking the wires. This is a fast operation, extremely fast relative to potting.

Then the thermosetting plastic must cure in the cavity, and the residence time for the best commercial results has been found to be greater than fifteen seconds (which is the time for passage to the cavity) and less than five minutes.

It is important to remember when considering polymerization as it occurs in this molding process, that it includes factors af time and temperature, and at the same temperature polymerization takes place with time as the material is flowing through the runner. Heating will not reduce the viscosity. Actually, it will increase it and impede the flow because the polymerization taking place is increasing the viscosity.

Mineral or glass filler epoxies, silicones, phenolics, diallyl phthalates, thermosetting plastic resins, or molding compounds have been found suitable for the transfer molding operation in encasing the semiconductor assembly of FIGS. 1 and 2, as well as that in FIG. 9 which will be described. These resins or molding compounds include a filler, as glass or mineral and the resin, and are readily available and may be obtained from a variety of sources. For example, Pacific Resins and Chemicals, Inc., Seattle, Washington, produces an epoxy thermosetting resin, designated by them as Code No. S–1311, which has proven to be suitable for the purpose. Likewise, Hysol Corporation, Olean, New York, produces an opoxy thermosetting resin, designated by them as MG4, which has also proven to be well suited for the purpose. Epoxy Products Co. of Irvington, New Jersey, has an epoxy known by the Code No. 2010, and another, Code No. 2020, while Fiberite Corp. of Winona, Minnesota, has one with Code No. 9451, all of which have been suitable.

The Dow Corning Corporation, Midland, Michigan, produces a silicon resin, designated by their code number 304, which also has proven to be suitable. General Electric Company and Union Carbide Corporation each have what is known as Silicon Molding compound, which is suitable.

Of the phenolics, Durez Plastics Division of Hooker Chemical Corporation has a thermosetting plastic known by Code No. 22236, which has provided suitable molding under the present invention, and Union Carbide Corporation likewise has a phenolic material suitable for the practice of the present process.

Mesa Plastics Company of Los Angeles, California, has a diallyl phthalate thermosetting plastic under the trademark Diall, and Fiberite Corporation of Winona, Minn., has such a material which it sells under its trademake Fiberite which will be satisfactory.

It will be understood that the transfer molding operation described is a technique whereby cold molding compound material is placed in a hot die so that melting and low viscosity flow occurs in runners, gates, and cavities and then curing occurs in the mold cavity. The mold cavity is essentially a hydraulically sealed cavity in which the plastic can be placed under pressure and temperature for the purpose of curing the plastic so as to achieve the hard thermosetting properties required for the particular packaging application.

The mold is heated by an appropriate means, such as by electrical resistance heating elements. Other types of heating, such as induction heating, steam heating, gas heating, and the like, may be used. In any event, it is important in the practice of the present invention, prior to reaching the cavity with minimum curing, that the mold be maintained at a sufficiently high temperature to assure melting and low viscosity flow, and then curing of the plastic in the mold cavity, and that the high temperature be precisely maintained at a preset level.

More specifically, when the mold parts 24 and 45 are maintained at the proper accurately controlled high temperature, the granules, or preforms, of the appropriate plastic material are placed into the passageway 50. The material falls down to the bottom of the passageway by gravity. The piston, or plunger 52, is then brought down into the passageway to apply pressure to the plastic material being heated. The material becomes molten as its temperature increases. When the material is completely in the fluid state, additional accurately controlled pressure is applied to the plunger, or piston 52, in a slow-closing operation. This then causes the molten plastic material to be forced through runner 53, gate 54, and into the cavity 55.

Figure 7:
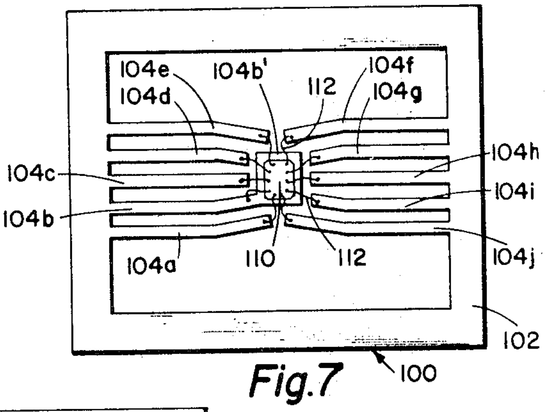
FIG. 7 is a view, similar to FIGS. 5 and 6, and showing the manner in which fine wires are used to connect various electrodes on the active semiconductor element to the corresponding leads extending from the lead clip.

As the plastic material melts, it immediately starts to cure, and this reaction rate must be controlled so that the plastic material is moved from the runner 53 into the cavity 55, when only a minimum of curing has occurred. Otherwise, excessive viscosities will be encountered in the runner 53 and gate 54, but more importantly such viscosities in the cavity will break or tear the fine wires 18 and 19 in the first embodiment, and 112 in the second embodiment (FIG. 7). Basically, most of the curing should occur in the mold cavity 55. Full hydraulic pressure is exerted on the fluid plastic material inside the mold cavity while it polymerizes and a high density, void-free, monolithic encasement is achieved, with the fine wires supported by the plastic.

After the appropriate molding cure time has elapsed, the mold is opened by separating the part 45 from the part 24. The workpiece is then ejected from the part 24, as mentioned, and the package is complete.

In one specific molding example of the practice of this invention, Pacific Resins' S–1311 epoxy compound was used. The material was heated and maintained at 150° C. during the molding operation. The plunger 52 exerted a pressure of 500 p.s.i. on the molten material in the cavity 55. The complete molding cycle through mold cure required one minute.

In other satisfactory operations, Dow Corning's 304 silicone molding compound was used. The temperature of the mold was 170° C., the plunger 52 exerted a pressure of 400 p.s.i., and the total molding cycle time was two to five minutes.

In the transfer molding employed in the present invention, the viscosity of the molten plastic material forced into the mold cavity is much lower than in other types of molding, i.e. injection molding or compression molding. Thus, there is much less danger of breaking the delicate, fine wires connecting the leads to the semiconductor electrodes. In other words, the plastic material has a fluidity such that it flows about the fine wires and completely encases the semiconductor element and the wires without exerting sufficient force against the wires to break them or their connections. In addition, this transfer molding with thermosetting plastics, as explained above, provides a very high density and mechanically strong housing, and the semiconductor element being mounted directly on a stiff lead, or at least one with body provides excellent heat conduction from the semiconductor element to external circuitry.

It has been found that thermosetting plastic resins provide a number of advantages over other types such as thermoplastic plastics. They generally have low viscosity when hot, which is very important, as pointed out previously. They do not deteriorate mechanically with age and the creep rate is low, they are capable of withstanding high temperatures without melting (while thermoplastic plastics do melt), and they do not chemically break down to form by-products that might form conductive paths between electrodes or leads. Furthermore, they have low moisture absorption, and do not shrink so that they might withdraw from the leads.

The second embodiment of the invention is shown in FIGS. 5–9. This latter embodiment, likewise, is formed of a headerless construction and by means of a single transfer molding step. The latter embodiment has the flat configuration which, as noted previously, has certain advantages, especially from a packing and stacking standpoint.

Figure 9:
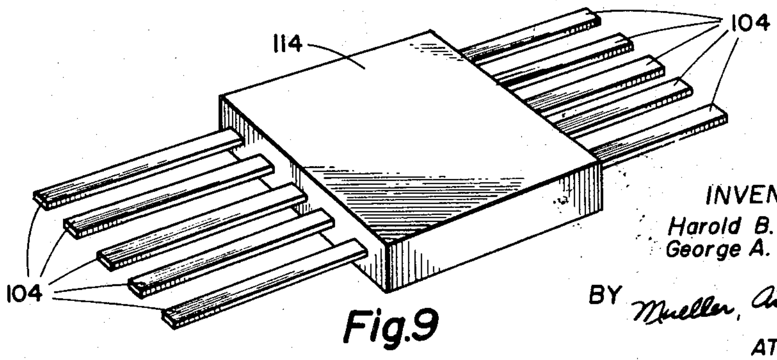
FIG. 9 shows the second embodiment of the invention, complete and ready for use.

It should be noted at the outset that the completed unit shown in FIG. 9 is on an enlarged scale. The external dimensions of the package are relatively small. For example, the body portion may be of the order of 0.250 inch square, and it may have a thickness of .050 inch. The leads protruding from the central element may extend, for example, about a quarter of an inch from the edge of the central element.

Figure 5:
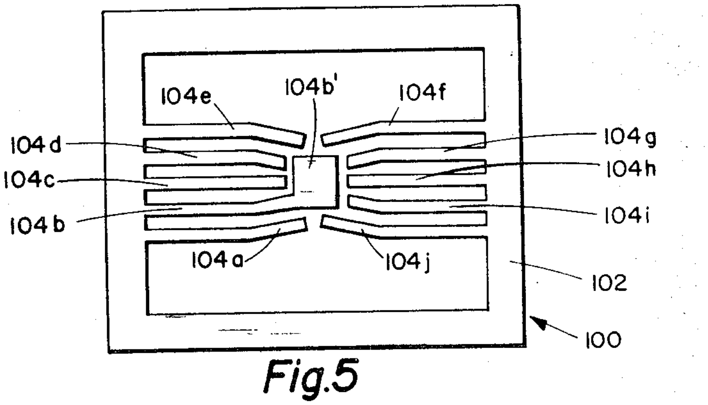
FIG. 5 is a top plan view of a lead clip used in the construction of a second embodiment of the invention.

The views of FIGS. 5–8 show the component parts of the integrated circuit assembly, and the order of their assembly. The leads of the unit are originally stamped out in the form of a flat metal clip 100 (FIG. 5). The clip 100 is composed of a frame 102, and the leads **104*a*–104*j* extend inwardly from opposite edges of the frame, as shown. The frame 102 is subsequently cut from the leads 104** (FIG. 8), so that the leads protrude from the central casing, as shown in FIG. 9.

The clip 100 may be formed by etching, punching, or the like, and it may be composed of a suitable electrically conductive material such as gold-plated copper, for example. The inner tips of the leads may be coated, for instance, with aluminum as a preparatory step to a subsequent bonding operation. The fixed framework of leads provided by the clip 100 assures proper lead location and alignment with respect to the integrated circuit element.

Figure 6:
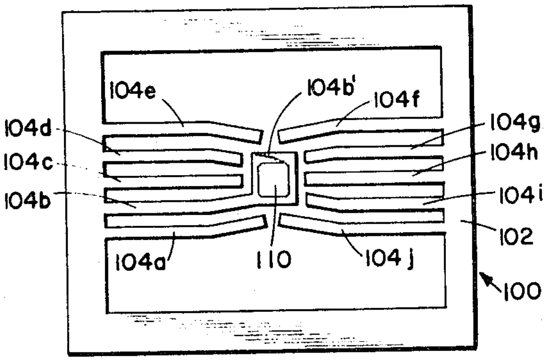
FIG. 6 is a view, like FIG. 5, of the lead clip with an active semiconductor element supported in place on a portion thereof, representing a second step in the construction of the second embodiment of the invention.

One of the leads, in this case the lead **104*b*, extends into the central portion of the clip 100 and has an enlarged end portion to form a pad 104*b*' for an integrated circuit element 110 (FIG. 6). The integrated circuit element 110** may be a silicon chip, for example, including a plurality of integrated circuit components and corresponding electrodes.

The chip 110 is supported on the pad **104*b*' (FIG. 6) and it is bonded thereto in any appropriate manner and by any suitable die bonding technique. Fine aluminum wires, or other suitable connectors 112, are bonded to the various electrodes of the chip 110 and are connected, for example, by bonding techniques to the respective leads 104*a*–*j* (FIG. 7). These wires may be attached to the chip 110 to the leads 104 in the same manner in which the leads 18 and 19 were attached to the electrodes 34 and 35 and to the flattened-end portions 31 and 32** in the previous embodiment.

After a protective and passivating operation, such as previously described, the assembly shown in FIG. 7 is placed in an appropriate transfer mold, which may be similar to the mold of FIG. 4. A monolithic molded casing 114 (FIG. 8) is formed by molding over the passivated sensitive elements. During the passivating operation, and in a manner similar to that described in conjunction with FIGS. 3E and 3F, for example, an oxide deposit, such as alumina or silica, may be formed over the elements. The passivation operation can be carried out by a vapor operation by means of which the alumina or silica is deposited through the mask in accordance with known techniques. The resulting passivation layer on the integrated circuit element provides compatibility with the encapsulating material and isolates the element therefrom.

Figure 8:
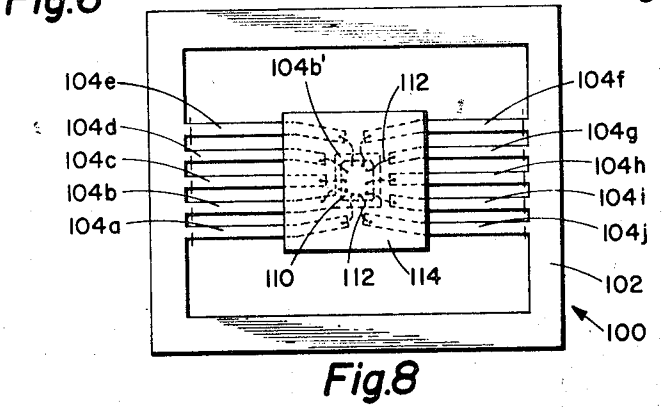
FIG. 8 is a view like FIGS. 5, 6, and 7 and showing the second embodiment of the invention in a near-completed form.

Upon removal from the mold, the frame 102 may be trimmed from the lead clip 100, as shown by short vertical lines in FIG. 8, and the completed unit has the configuration shown in FIG. 9. Alternatively, the leads may be left connected to the frame until the unit is to be used, in order to protect the leads. Of course, more or fewer leads may be used as required. These protruding leads, as was the case in the first embodiment, may be soldered or welded to external circuit boards or other external circuitry.

One of the principal features of the clip 100 is that only three different versions of the clip are required, when using a ten-lead clip, to provide a supporting pad on any one of the ten leads. For example, the clip may be used as illustrated in FIG. 5, or it may be rotated 180° to place the pad as though it were connected to the lead **104*g*, or it may be turned over to place the pad as though it were connected to the lead 104*i*, and it may then be rotated 108° to place the pad as though it were connected to the lead 104*d*. Similarly, if the pad is connected to the lead 104*a*, it may be also positioned as though it were connected to the leads 104*f*, 104*j*, and 104*e*. If the pad is connected to the lead 104*c*, by turning over the clip it may be positioned as though connected to the lead 104*h*. Of course, the leads 104** are conductive on both their upper and lower surfaces. Thus, with only three configurations of the clip, the integrated circuit element may be mounted on any one of ten leads to provide for various electrode arrangements on the circuit element.

Figure 10:
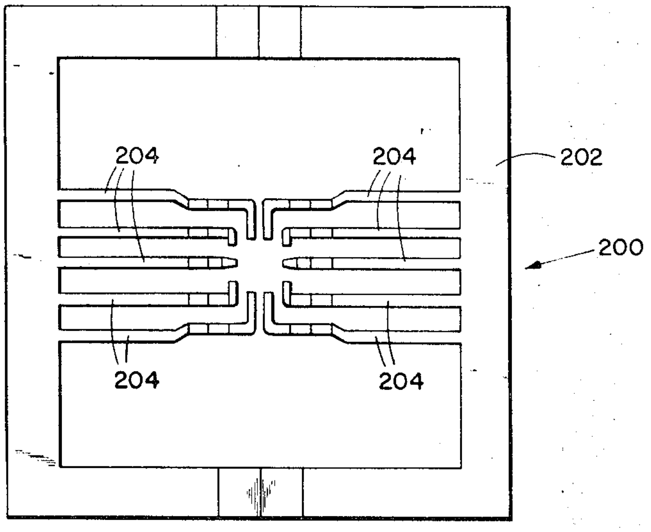
FIGS. 10 and 11 are views like FIGS. 5 and 6, respectively, of another lead clip used in the construction of a third embodiment of the invention.
Figure 11:
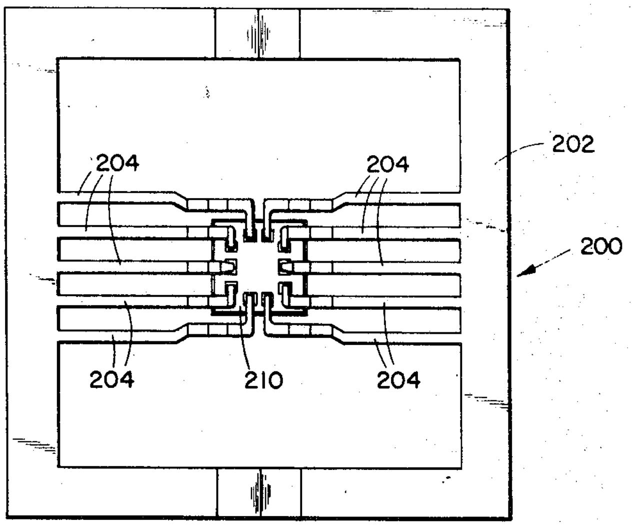

FIGS. 10 and 11 illustrate another embodiment of the invention in which the lead clip has no pad per se for supporting the integrated circuit element but, rather, all of the leads support the element. As shown, a lead clip 200 includes a frame 202 having a plurality of leads 204 extending inwardly from opposite edges thereof. The leads 204 are of such length and are so located that their inner ends respectively contact electrodes on the upper surface of an integrated circuit element 210 when it is positioned within the frame 202. The leads 204 may be bonded to the circuit element electrodes in any appropriate manner.

The molding process for this assembly is the same as that described with reference to FIG. 8, and the completed unit appears identical to that shown in FIG. 9 as the outside view. As is clear from the above, the fingers are bonded to the chip for connections therefrom instead of using wires.

It is pointed out that the lead clips shown in FIGS. 5 and 10 may be constructed in strip form. That is, a single frame could have a plurality of groups of leads extending therefrom, with each group comprising a plurality of integrated circuit elements and the leads could be assembled and the plastic housing molded about them simultaneously in a multi-cavity mold. This would result in further cost reduction.

It will be appreciated that no box or frame, or header of any type, is required during the assembly of the package, and the package is formed by a single transfer molding operation. The resulting solid encapsulation provides positive ambient control, as well as improved resistance to shock and vibration damage.

The fact that the semiconductor chip is mounted on a metallic pad which, in turn, is integral with a lead, provides for the efficient removal of heat from the unit, and represents a distinct advantage over that prior art in which the chip is cemented to a ceramic base through an adhesive generally having poor heat conductivity.

The invention provides, therefore, an improved and inexpensive monolithic package for an integrated circuit or transistor, or the like, and a method of making it. As described, the package of the invention is susceptible to a one-step molding operation and this results in a simplification in its fabrication with resulting saving in cost. The completed unit is durable and sturdy, and is reliable in operation.

While particular embodiments of the invention have been described, modifications can be made. These are intended to be covered in the following claim.

What is claimed is:

1. A method for the manufacture of plastic encapsulated multi-contact-integrated-circuit semiconductor devices which employ fine wires in the multi-contact connections, and which method is adapted to accomplish the encapsulation without breaking the fine wires, such method including the steps of:

(a) providing a one-piece metallic assembly frame means which includes a plurality of frame portions with each such frame portion having within the same two oppositely disposed separated groups of extended portions, with each said group having in excess of one extended portion, and such extended portions of each group extending toward the other group from opposite directions and each extended portion being integral at one end with the frame portion therefor and free at the other end, a metal portion integral with and positioned within a frame portion having an enlarged mounting part which latter is centrally positioned within said frame portion and generally surrounded by the free ends of all said extended portions of said two groups so that said enlarged part is centrally located relative to each of said free ends in said two groups and said free ends are in positions which are spaced from one another around said enlarged part and generally surround said part, (b) providing a plurality of multiple-contact-integrated-circuit semiconductor units having a plurality of contact portions on at least one surface of each such unit, (c) mounting a semiconductor unit on said enlarged integral part for each such frame portion, with each contact portion on such unit being adapted to be connected with a corresponding extended portion at the free end of such extended portion, (d) securing a fine wire to a contact portion of each such semiconductor unit and to the free end of a corresponding extended portion to accomplish an electrical connection therebetween, (e) applying a protective coating on the contact portions of each such semiconductor unit and on the fine wires at the portions connected to said contact portions of such unit, (f) placing the one-piece metallic assembly frame means in a molding apparatus, (g) operating said molding apparatus, and at each frame portion of said metallic assembly frame means applying at the semiconductor unit, at the fine wires, and at the free ends of the extended portions to which wires are secured in a frame portion a thermosetting plastic molding compound which includes a filler and a resin system, which said plastic molding compound is compatible with said protective coating for each such semiconductor unit, said plastic encapsulation being accomplished in one molding step, (h) removing said assembly frame means from said molding apparatus with the thermosetting plastic compound encapsulating the structures of phrase (g) above, and (i) trimming the frame portions from said assembly frame means to provide a plurality of individual plastic encapsulated multi-contact-integrated-circuit semiconductor devices.

References Cited

UNITED STATES PATENTS

| | | | |
|---|---|---|---|
| 3,118,016 | 1/1964 | Stephenson | 174—68.5 |
| 3,171,187 | 3/1965 | Ikeda et al. | 29—588 |
| 3,262,022 | 7/1966 | Caracciolo | 29—588 |
| 3,264,712 | 8/1966 | Hayashi et al. | 29—588 |
| 3,281,628 | 10/1966 | Bauer et al. | 29—588 |
| 3,298,087 | 1/1967 | Hunt | 29—588 |
| 3,341,649 | 9/1967 | James | 29—588 |
| 3,367,025 | 2/1968 | Doyle | 29—588 |

JOHN F. CAMPBELL, Primary Examiner

P. COHEN, Assistant Examiner

U.S. Cl. X.R.

29—588